(12) United States Patent
Kondo et al.

(10) Patent No.: US 9,158,987 B2
(45) Date of Patent: Oct. 13, 2015

(54) IMAGE PROCESSING DEVICE THAT SEPARATES IMAGE INTO PLURAL REGIONS

(71) Applicants: Masaki Kondo, Toyoake (JP); Ryohei Ozawa, Nagoya (JP)

(72) Inventors: Masaki Kondo, Toyoake (JP); Ryohei Ozawa, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 123 days.

(21) Appl. No.: 13/795,717

(22) Filed: Mar. 12, 2013

(65) Prior Publication Data

US 2013/0259383 A1    Oct. 3, 2013

(30) Foreign Application Priority Data

Mar. 30, 2012    (JP) ................. 2012-079871

(51) Int. Cl.
| | |
|---|---|
| *G06K 9/46* | (2006.01) |
| *G06K 9/00* | (2006.01) |
| *G06K 9/34* | (2006.01) |
| *G06T 7/00* | (2006.01) |

(52) U.S. Cl.
CPC .............. *G06K 9/46* (2013.01); *G06K 9/00456* (2013.01); *G06K 9/00463* (2013.01); *G06K 9/34* (2013.01); *G06K 9/4652* (2013.01); *G06T 7/0081* (2013.01); *G06K 2209/01* (2013.01); *G06T 2207/20141* (2013.01)

(58) Field of Classification Search
CPC ........... G06K 9/48; G06K 9/50; G06T 1/0083
USPC .......................................... 382/17, 162, 203
See application file for complete search history.

(56) References Cited

U.S. PATENT DOCUMENTS

| | | | | |
|---|---|---|---|---|
| 6,104,832 | A | * | 8/2000 | Saito et al. .................... 382/176 |
| 6,115,498 | A | * | 9/2000 | Ro et al. ........................ 382/200 |
| 6,701,010 | B1 |   | 3/2004 | Katsuyama |

(Continued)

FOREIGN PATENT DOCUMENTS

| | | |
|---|---|---|
| JP | 11-288465 A | 10/1999 |
| JP | 2001-291058 A | 10/2001 |

(Continued)

OTHER PUBLICATIONS

Chen, Qiang, Sun, Quan-Sen, Heng, Pheng Ann, Xia, De-Shen. "A double-threshold image binarization method based on edge detector". Pattern Recognition 41 (2008).*

(Continued)

*Primary Examiner* — Kim Vu
*Assistant Examiner* — Molly Delaney
(74) *Attorney, Agent, or Firm* — Scully, Scott, Murphy & Presser P.C.

(57) ABSTRACT

An image processing device includes: a processor; and a memory storing computer-readable instructions therein. The computer-readable instructions, when executed by the processor, causes the image processing device to perform: a first separation to separate a target image represented by target image data into a plurality of regions that include a first region and a second region different from the first region; a second separation to separate the first region into a plurality of sub-regions and to separate the second region into a plurality of sub-regions; and generating a consolidated region by consolidating at least two sub-regions among the plurality of sub-regions separated from the first and second regions.

8 Claims, 8 Drawing Sheets

(56) References Cited

U.S. PATENT DOCUMENTS

| | | | |
|---|---|---|---|
| 7,446,903 B2* | 11/2008 | Hagai et al. | 358/3.03 |
| 7,616,813 B2* | 11/2009 | Nishida | 382/173 |
| 7,831,107 B2* | 11/2010 | Dai et al. | 382/266 |
| 8,229,214 B2* | 7/2012 | Fukuoka et al. | 382/164 |
| 8,396,298 B2* | 3/2013 | Dai | 382/199 |
| 8,401,303 B2* | 3/2013 | Dai | 382/195 |
| 8,401,306 B2* | 3/2013 | Dai | 382/199 |
| 8,447,113 B2* | 5/2013 | Hara et al. | 382/182 |
| 2004/0165773 A1* | 8/2004 | Katsuyama | 382/173 |
| 2004/0218822 A1* | 11/2004 | Takahashi | 382/237 |
| 2005/0123214 A1* | 6/2005 | Takahira | 382/266 |
| 2005/0180645 A1* | 8/2005 | Hasegawa et al. | 382/239 |
| 2006/0039608 A1* | 2/2006 | Nishida | 382/190 |
| 2009/0010541 A1* | 1/2009 | Aihara | 382/173 |
| 2009/0041344 A1 | 2/2009 | Campbell et al. | |
| 2009/0316219 A1 | 12/2009 | Ohashi | |
| 2010/0201852 A1* | 8/2010 | Tsuruoka et al. | 348/254 |
| 2010/0220927 A1 | 9/2010 | Kim et al. | |
| 2013/0044952 A1* | 2/2013 | Du | 382/170 |
| 2013/0106897 A1* | 5/2013 | Zhao | 345/589 |

FOREIGN PATENT DOCUMENTS

| | | |
|---|---|---|
| JP | 2006-085665 A | 3/2006 |
| JP | 2010-002991 A | 1/2010 |
| WO | 2006/066325 A1 | 6/2006 |

OTHER PUBLICATIONS

Pietikainen, M. et al., "Edge-based method for text detection from complex document images", Document Analysis and Recognition, 2001, Proceedings Sixth International Conference on Seattle, WA, USA Sep. 10-13, 2001, pp. 286-291.

Extended European search report dated Feb. 12, 2015 received in related EP 13159021.8.

\* cited by examiner

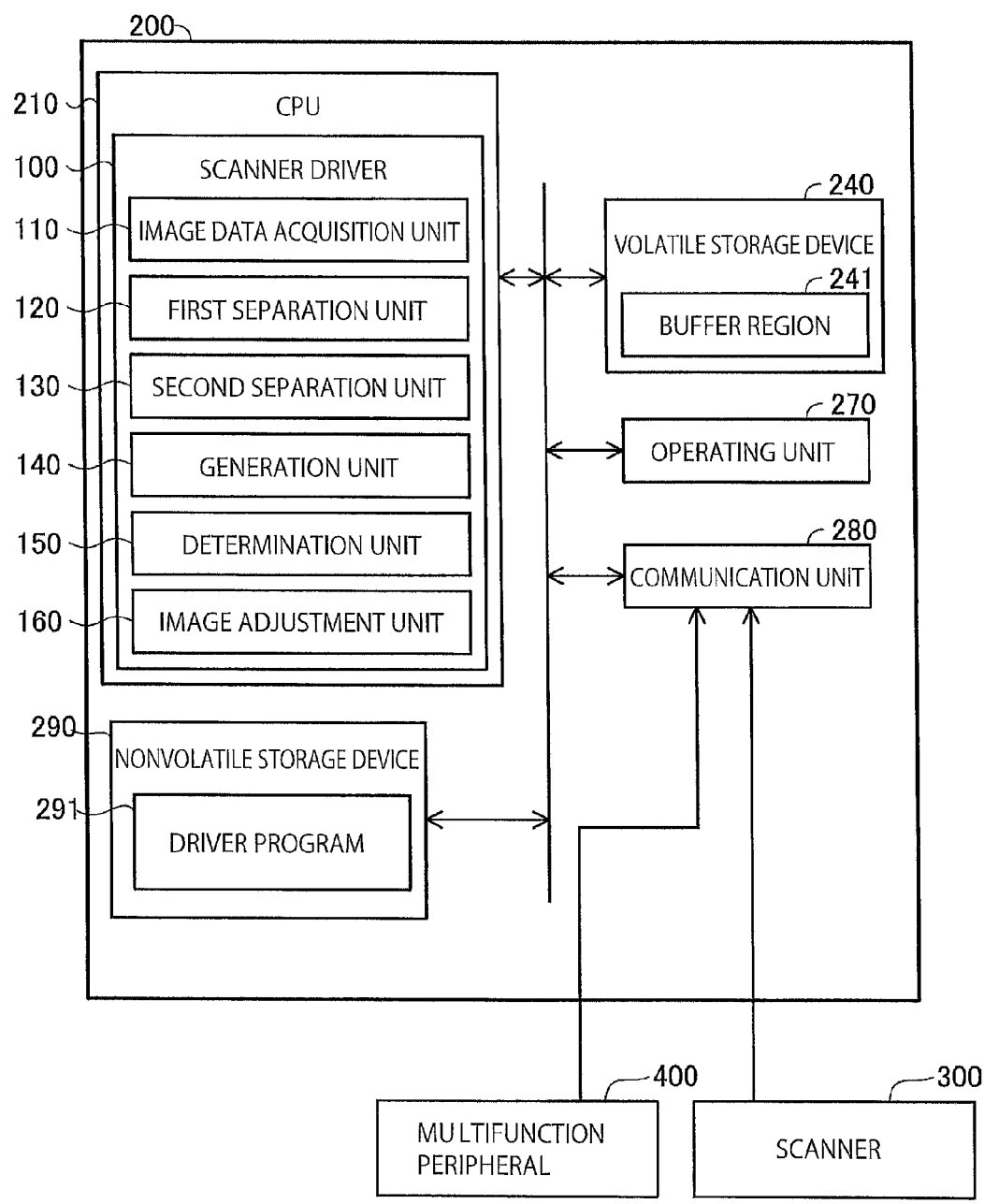

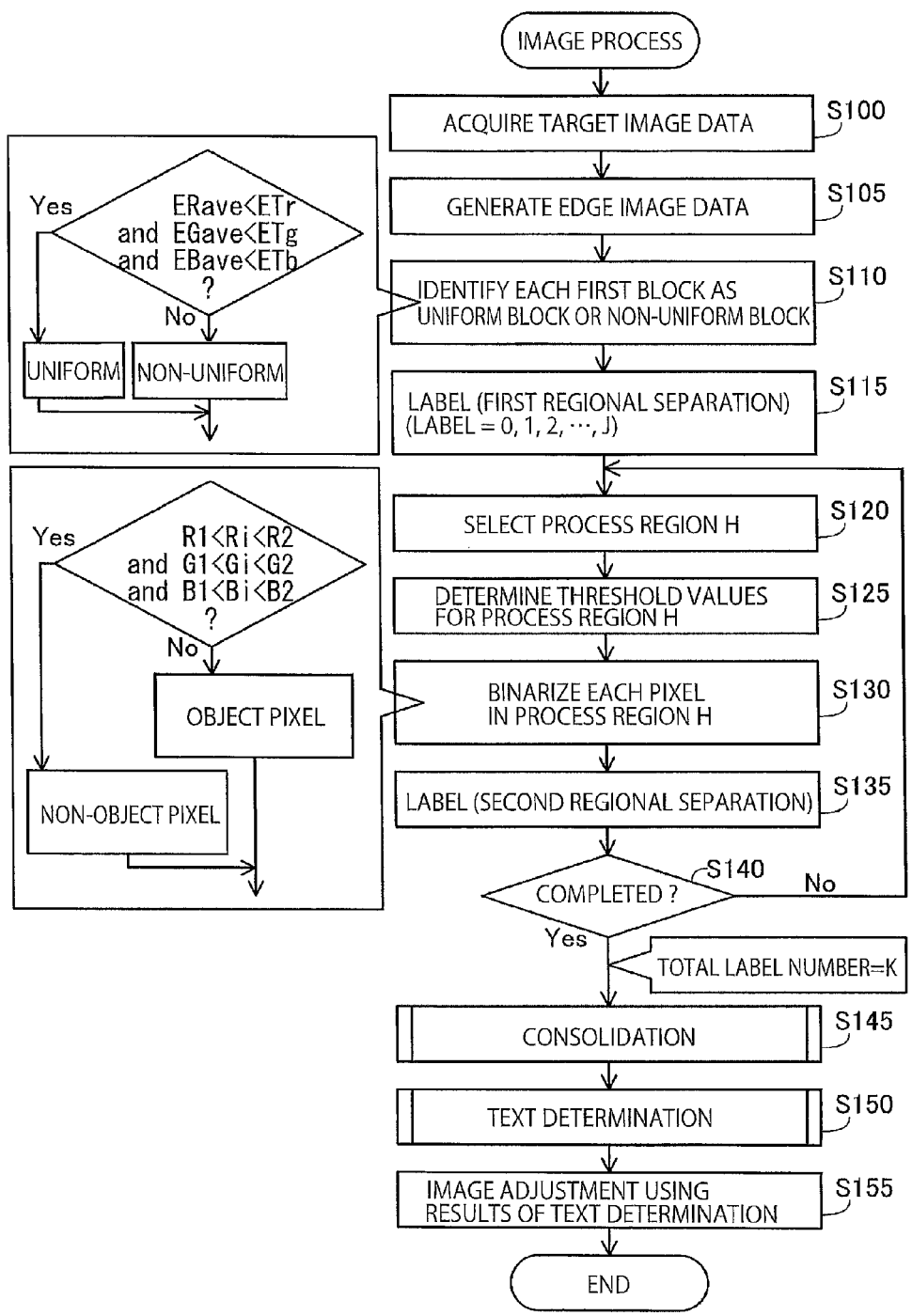

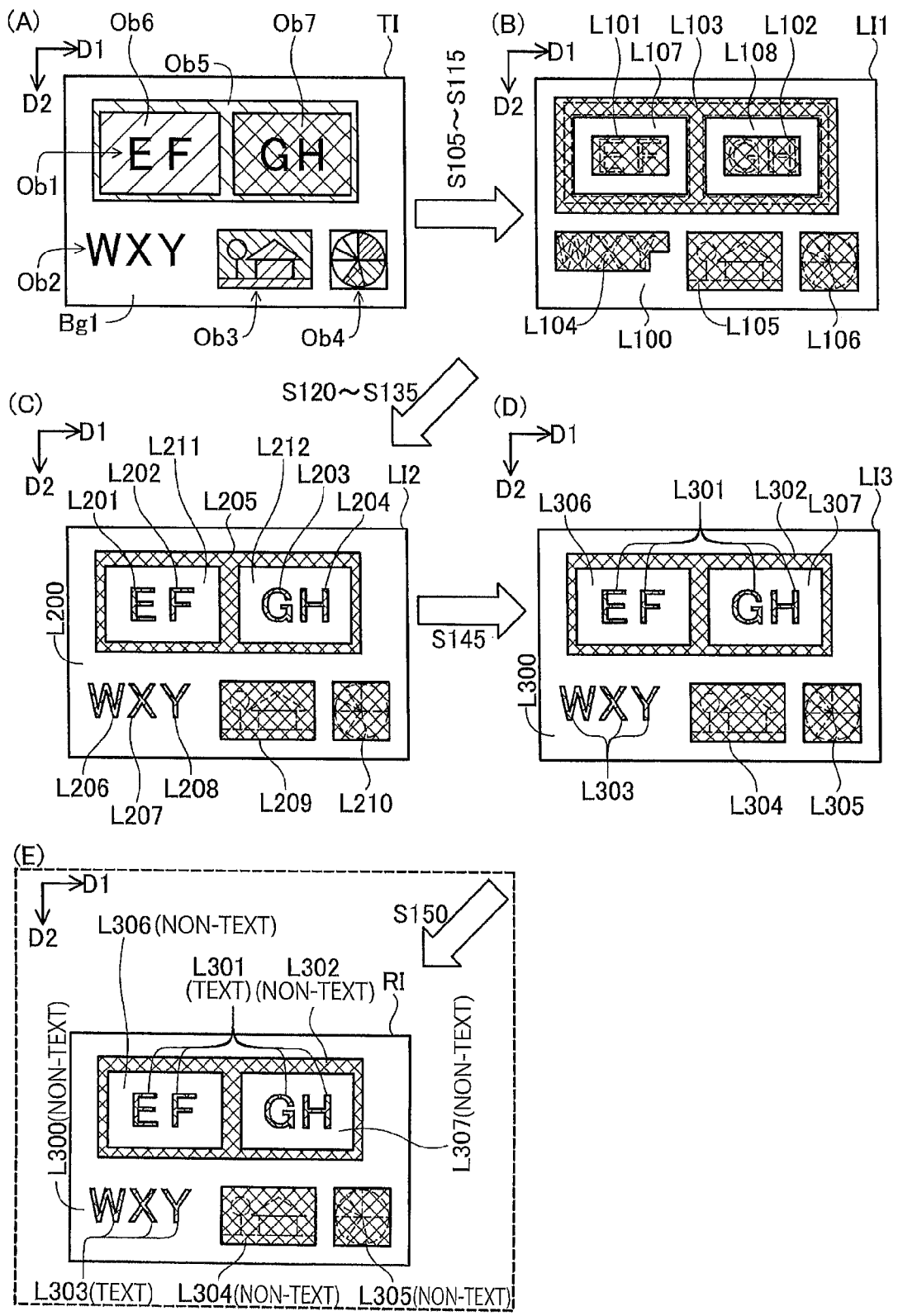

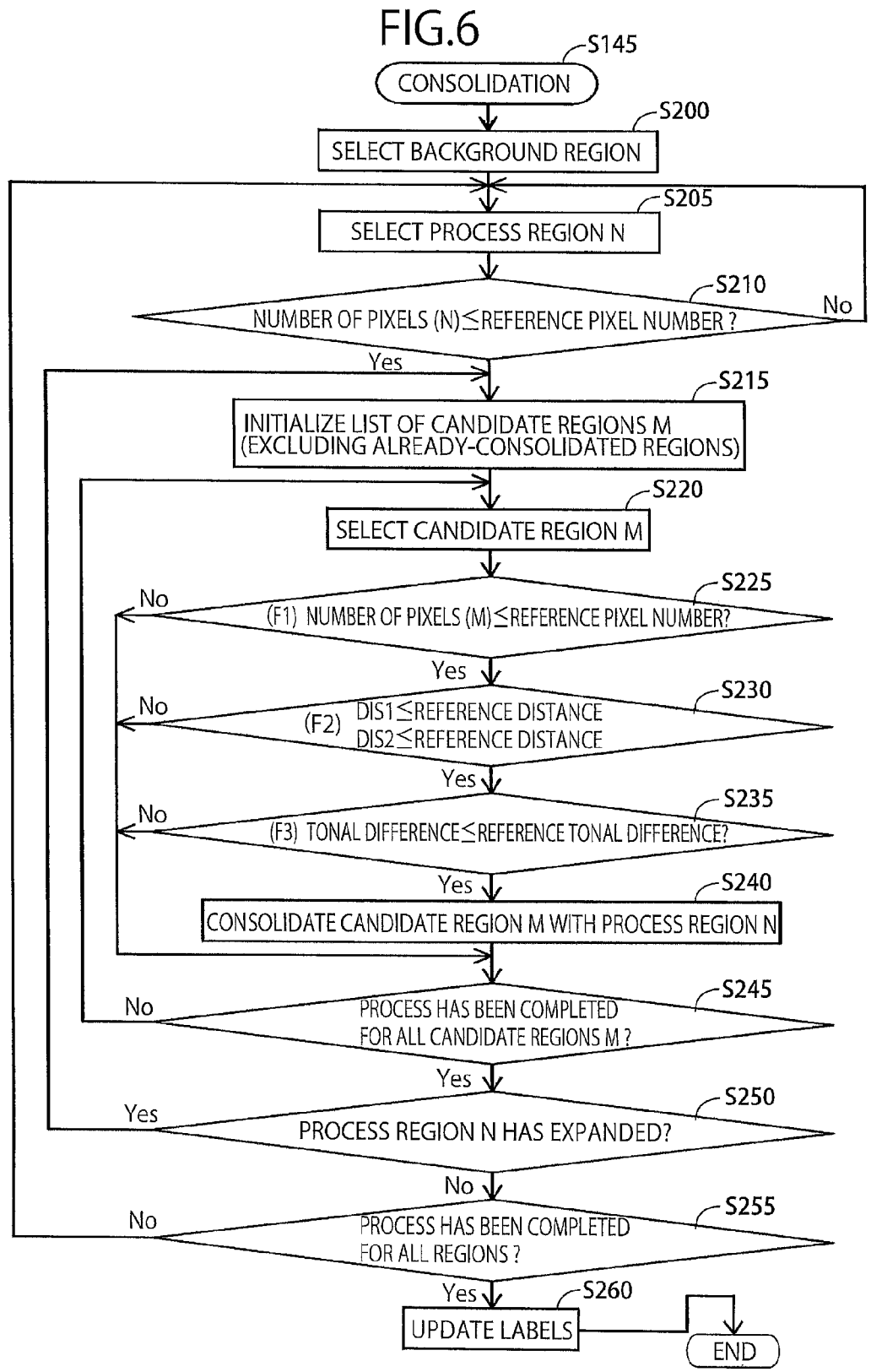

IMAGE PROCESSING DEVICE THAT SEPARATES IMAGE INTO PLURAL REGIONS

CROSS REFERENCE TO RELATED APPLICATION

This application claims priority from Japanese Patent Application No. 2012-079871 filed Mar. 30, 2012. The entire content of this priority application is incorporated herein by reference.

TECHNICAL FIELD

The present invention relates to an image processing device for separating or dividing an image into a plurality of regions.

BACKGROUND

There has been conventionally proposed an image process for separating a single image into a plurality of regions. According to one example of such an image process, a suitable threshold is first used to convert an entire image into a binary image. Character rectangles are found out by extracting groups of connected black pixels out of the binary image. A threshold value is determined for each rectangle, and each rectangle is locally converted into a binary image by using the determined threshold value. That is, each rectangle is locally binarized by using the determined threshold value. A threshold value for the entire image is then determined based on the threshold value for each rectangle. Parts of the entire image other than the already-binarized portions are binarized by using the threshold value determined for the entire image. This method is described in Japanese Patent Application Publication No. 2001-291058, for example.

SUMMARY

However, when the entire image has a plurality of regions that indicate contents different from one another, there is a case that the plurality of regions cannot be separated properly. For example, a region that should be identified as a single region is erroneously separated into a plurality of regions.

An object of the present invention is therefore to provide an improved image processing device that enhances the precision for separating regions.

In order to attain the above and other objects, the invention provides an image processing device including: a processor; and a memory storing computer-readable instructions therein. The computer-readable instructions, when executed by the processor, causes the image processing device to perform: a first separation to separate a target image represented by target image data into a plurality of regions that include a first region and a second region different from the first region; a second separation to separate the first region into a plurality of sub-regions and to separate the second region into a plurality of sub-regions; and generating a consolidated region by consolidating at least two sub-regions among the plurality of sub-regions separated from the first and second regions.

According to another aspect, the present invention provides an image processing method including: performing a first separation to separate a target image represented by target image data into a plurality of regions that include a first region and a second region different from the first region; performing a second separation to separate the first region into a plurality of sub-regions and to separate the second region into a plurality of sub-regions; and generating a consolidated region by consolidating at least two sub-regions among the plurality of sub-regions separated from the first and second regions.

According to another aspect, the present invention provides a non-transitory computer-readable medium storing computer-readable instructions therein. The computer-readable instructions, when executed by a processor, causes an image processing device to perform: a first separation to separate a target image represented by target image data into a plurality of regions that include a first region and a second region different from the first region; a second separation to separate the first region into a plurality of sub-regions and to separate the second region into a plurality of sub-regions; and generating a consolidated region by consolidating at least two sub-regions among the plurality of sub-regions separated from the first and second regions.

BRIEF DESCRIPTION OF THE DRAWINGS

The particular features and advantages of the invention as well as other objects will become apparent from the following description taken in connection with the accompanying drawings, in which:

FIG. 1 is a block diagram showing the structure of a computer according to an embodiment of the present invention;

FIG. 2 is a flowchart illustrating steps in an image process executed by the computer shown in FIG. 1;

FIG. 3 includes schematic diagrams showing the general progression in the image process, wherein the image process advances in the order of stages (A), (B), (C), (D), and (E);

FIG. 4A-FIG. 4D are schematic diagrams illustrating the process performed by a first separation unit shown in FIG. 1, wherein FIG. 4A shows a target image, FIG. 4B shows an edge image outlining features in edge image data, FIG. 4C shows results of classification into non-uniform blocks and uniform blocks, and FIG. 4D shows the results of identifying (labeling) regions;

FIG. 6 is a flowchart illustrating steps in a consolidation process shown in FIG. 2;

FIG. 8A-FIG. 8D include schematic diagrams illustrating a process of consolidating four regions, wherein FIG. 8A shows a stage where a first region is expanded to include a second region, FIG. 8B shows a stage where the expanded first region is further expanded to include a third region, FIG. 8C shows a stage where the expanded first region is further expanded to include a fourth region, and FIG. 8D shows a resultant first region that has expanded to include the second through fourth regions.

DETAILED DESCRIPTION

A. Embodiment

Figure 4A:
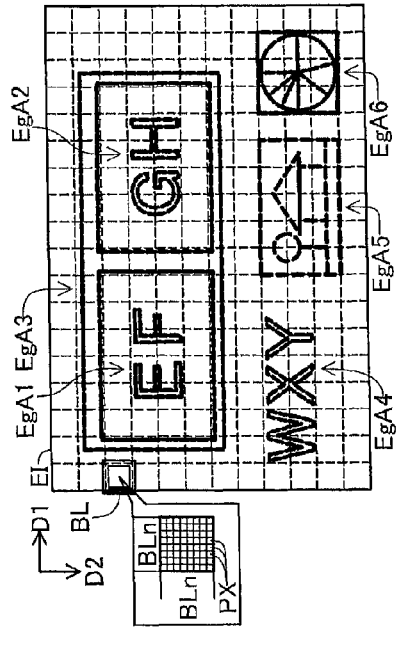

Next, an embodiment of the present invention will be described while referring to the accompanying drawings. FIG. 1 is a block diagram showing the structure of a computer 200 serving as the embodiment of an image processing device or image processor according to the present invention. The computer 200 is a personal computer, for example, that includes a CPU 210; a volatile storage device 240, configured of DRAM or the like; a nonvolatile storage device 290, configured of flash memory, a hard disk drive, or the like; an operating unit 270, such as a touchscreen, keyboard, and the like; and a communication unit 280 providing an interface for the computer 200 to communicate with external devices.

The computer 200 is connected to and capable of communicating with external devices (a scanner 300 and a multifunction peripheral 400 in the embodiment) via the communication unit 280. The scanner 300 is an image-reading device that acquires scan data by optically reading a physical object (a paper document, for example). The multifunction peripheral 400 includes an image-reading unit for acquiring scan data by optically reading an object.

The volatile storage device 240 is provided with a buffer region 241 for temporarily storing various intermediate data generated when the CPU 210 performs processes. The nonvolatile storage device 290 stores a driver program 291.

By executing the driver program 291, the CPU 210 functions as a scanner driver 100. The scanner driver 100 includes an image data acquisition unit 110, a first separation unit 120, a second separation unit 130, a generation unit 140, a determination unit 150, and an image adjustment unit 160. As will be described later, the scanner driver 100 executes an image process on scan data serving as target image data. Through this process, the scanner driver 100 separates a target image represented by the target image data into a plurality of regions and identifies the type (i.e., attribute) of image in each isolated region (the type of object within the region).

FIG. 2 is a flowchart illustrating steps in an image process executed by the scanner driver 100. In S100 of the image process, the image data acquisition unit 110 of the scanner driver 100 acquires scan data through the communication unit 280 as target image data (image data to be processed). More specifically, the image data acquisition unit 110 controls the scanner 300 or the image-reading unit of the multifunction peripheral 400 to generate scan data and acquires this scan data. The scan data represents the results of reading a paper document, for example, and is configured of bitmap data representing the colors of a plurality of pixels.

FIG. 3 includes schematic diagrams showing the general progression in the image process. The image process advances in the order of stages (A), (B), (C), (D), and (E) in FIG. 3 as described below. Images TI, LI1, LI2, LI3, and RI shown in FIG. 3 illustrate sample processing results in the five stages (A)-(E), respectively. The target image TI obtained in stage (A) is a sample image represented by scan data. The target image TI is configured of a plurality of pixels (not shown) arranged in a matrix along a first direction D1 and a second direction D2 orthogonal to the first direction D1. Pixel data for a single pixel represents gradation values for the three color components red (R), green (G), and blue (B), for example, where each gradation value can be one of 256 levels, for example.

In the example of FIG. 3, stage (A), the target image TI includes a background image Bg1, two text images Ob1 and Ob2, a photo image Ob3, and four drawing images Ob4-Ob7. Here, a text image is an image representing one or more characters. A photo image is a photographic image captured by a digital camera, or is acquired by extracting a still image from a motion picture, for example. A drawing image is an image expressed by a drawing, such as an illustration, table, graph, diagram, vector art, pattern, or the like. Hereinafter, a text image will also be called a "text object," a photo image a "photo object," and a drawing image a "drawing object." Further, text images, photo images, and drawing images will also be referred to collectively as "objects."

The objects Ob1-Ob7 in the target image TI have been recorded on a scanning target (a paper document or original, for example) for generating scan data. In the example of FIG. 3, stage (A), the first object Ob1 represents a character string including the four characters "E", "F", "G", and "H". The second object Ob2 represents a character string including the three characters "W", "X", and "Y". The fifth object Ob5 represents a border. The sixth object Ob6 represents a uniform region within the border. The seventh object Ob7 represents a separate uniform region within the border. The two characters "E" and "F" in the first object Ob1 are arranged within the sixth object Ob6, while the remaining characters "G" and "H" in the first object Ob1 are arranged within the seventh object Ob7. The colors of the sixth object Ob6, seventh object Ob7, and background image Bg1 differ from one another.

Figure 4B:
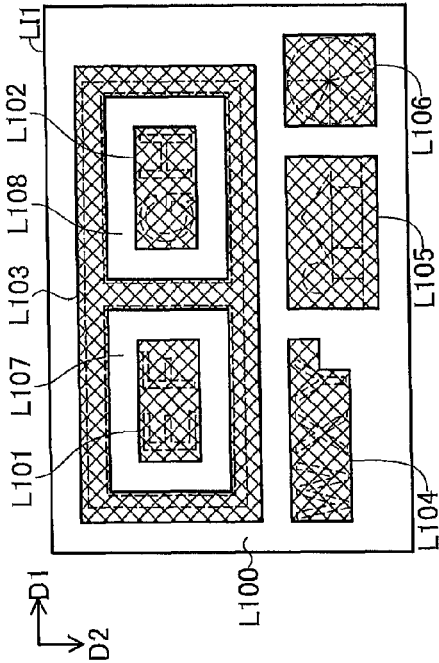

In S105-S115 of FIG. 2, the first separation unit 120 (see FIG. 1) separates or divides the target image TI into a plurality of regions. Specifically, in S105 the first separation unit 120 analyzes the target image TI (scan data) to generate edge image data. FIG. 4A-FIG. 4D are schematic diagrams illustrating the process performed by the first separation unit 120. FIG. 4A shows the target image TI, and FIG. 4B shows an edge image EI that outlines features in the edge image data.

The edge image data represents edge strength for each pixel image in the target image TI. Edge strength represents the magnitude of change in gradation values between positions in the image (among a plurality of neighboring pixels). The following equation (1) is an equation for calculating edge strength used in the embodiment. In this example, the first separation unit 120 uses the Sobel operator to calculate an edge strength Se for each of the three color components red, green, and blue.

$$Se(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| + \\ \left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| \quad (1)$$

P(x, y) in the equation (1) represents the gradation value for a specific pixel position (x, y) in the target image TI. The coordinate x indicates the pixel position in the first direction D1, while the coordinate y indicates the pixel position in the second direction D2. As shown in the equation (1), the first separation unit 120 calculates the edge strength Se(x, y) for pixel position (x, y) in the target image TI using a 3×3 block of adjacent pixels (i.e., nine pixels) centered on the pixel position (x, y). The first and second operators in the equation (1) are each the absolute value of the sum of products obtained by multiplying the gradation values of the nine pixels by corresponding coefficients. The first operator represents the magnitude of change in gradation values in the first direction D1, while the second operator represents the magnitude of change in gradation values in the second direction D2.

The edge image EI in FIG. 4B represents an RGB-average edge strength obtained for each pixel position by averaging the edge strengths of red, green, and blue in the each pixel position. In the drawing, pixels having a low RGB-average edge strength are depicted in white and pixels having a high RGB-average edge strength are depicted in black. The edge image EI in this example includes edges EgA1-EgA6 for the corresponding objects Ob1-Ob7 in the target image TI. Note that the edge image EI (RGB-average edge strengths) is described only to facilitate understanding of the embodiment, but is not generated during the image process. That is, during the image process, only the edge strength Se(x, y) is generated for each color component R, G, B, but the RGB-average edge strength is not generated.

After generating the edge image data in S105 of FIG. 2, the first separation unit 120 identifies uniform regions and non-uniform regions in S110 and S115 for each of first blocks BL configured of a plurality of pixels. As illustrated in FIG. 4B, the first blocks BL are arranged in a matrix on the edge image EI (that is, the target image TI). One first block BL is a block of pixels PX arranged in BLn rows×BLn columns, for example (where BLn is an integer of 2 or greater). The value of BLn may be any value within the range 10-50, for example.

A uniform region has smaller edge strengths than prescribed reference values, while non-uniform regions have edge strengths greater than or equal to the corresponding reference values. In S110 the first separation unit 120 calculates average edge strengths ERave, EGave, and EBave for each first block BL. The average edge strengths ERave, EGave, and EBave are calculated for the three color components red, green, and blue, respectively. The first separation unit 120 compares the average edge strengths in the first block BL being processed with the prescribed reference values to classify the current first block BL as a uniform block or a non-uniform block. A uniform block has smaller average edge strengths than the corresponding reference values, while a non-uniform block has average edge strengths greater than or equal to the reference values. In the embodiment, the first separation unit 120 compares the average edge strengths ERave, EGave, and EBave to reference values ETr, ETg, and ETb preset for corresponding color components. If ERave<ETr, EGave<ETg, and EBave<ETb, the first separation unit 120 classifies the first block BL as a uniform block. That is, if the average edge strengths ERave, EGave, and EBave are smaller than the corresponding reference values ETr, ETg, and ETb, respectively, the first separation unit 120 classifies the first block BL as a uniform block. Conversely, if at least one of the expressions ERave≥ETr, EGave≥ETg, and EBave≥ETb is satisfied, then the first separation unit 120 classifies the first block BL as a non-uniform block. That is, if at least one of the average edge strengths ERave, EGave, and EBave is greater than or equal to the corresponding reference values ETr, ETg, and ETb, then the first separation unit 120 classifies the first block BL as a non-uniform block.

Figure 4C:
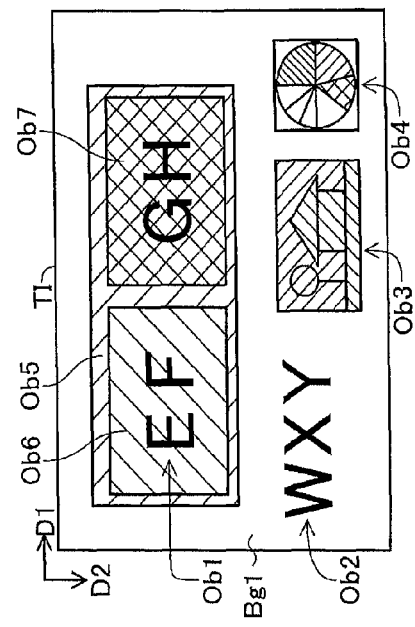

An image SI in FIG. 4C shows the results of the classification in S110, where shaded first blocks BL represent non-uniform blocks and non-shaded first blocks BL represent uniform blocks. As shown in FIG. 4C, the classification process produces six regions Na1-Na6 each having a plurality of contiguous (neighboring) non-uniform blocks. These regions Na1-Na6 are separated from each other by uniform blocks. The two regions Na1 and Na2 correspond to the first object Ob1 in FIG. 4A. The remaining four regions Na3, Na4, Na5, and Na6 respectively correspond to the four objects Ob5, Ob2, Ob3, and Ob4. The uniform blocks arranged within the third region Na3 correspond to either the sixth object Ob6 or the seventh object Ob7. The other uniform blocks correspond to the background image Bg1. Hence, non-uniform blocks generally represent objects composed of pixels having non-uniform gradation values, while uniform blocks generally represent the background or objects composed of pixels having substantially uniform gradation values. Objects composed of pixels with substantially uniform gradation values may be a type of background, as well.

After identifying uniform blocks and non-uniform blocks in S110 of FIG. 2, in S115 the first separation unit 120 identifies (labels) the uniform regions and non-uniform regions in the target image TI. Specifically, the first separation unit 120 identifies a region configured of one or more contiguous non-uniform blocks as a single non-uniform region, and identifies a region configured of one or more contiguous uniform blocks as a single uniform region. So, each non-uniform region is composed of one or more non-uniform blocks that are arranged continuously with one another, and each uniform region is composed of one or more uniform blocks that are arranged continuously with each other. Since one or more contiguous non-uniform blocks are incorporated into a single non-uniform region as described above, non-uniform regions are normally surrounded by uniform regions.

Figure 4D:
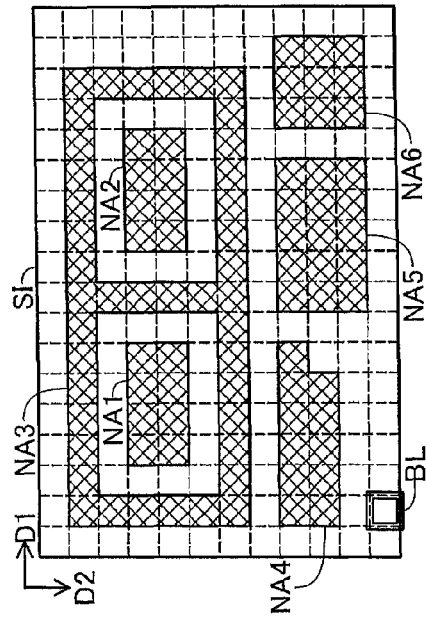

The first label image LI1 in FIG. 4D shows the results of identifying (labeling) regions in S115. In this example, the first separation unit 120 has identified six non-uniform regions L101-L106 corresponding to the regions Na1-Na6 of FIG. 4C, as well as two uniform regions L107 and L108 within the third region L103. The remaining regions constitute a uniform region L100. The first separation unit 120 assigns labels (such as 0-8) to the regions L100-L108 to identify the regions. For example, the first separation unit 120 assigns each pixel in the target image TI a label (identifier) indicating the region to which the pixel belongs. Note that the first label image LI1 in FIG. 4D is identical to the first label image LI1 shown in FIG. 3, stage (B).

After labeling the uniform and non-uniform regions in the target image TI in S115 of FIG. 2, the second separation unit 130 (see FIG. 1) performs a process in S120-S135 to separate each non-uniform region isolated by the first separation unit 120 into a plurality of sub-regions. Specifically, in S120 the second separation unit 130 selects one unprocessed non-uniform region as a process region H. In S125 the second separation unit 130 uses gradation values of a uniform region surrounding the process region H to determine threshold values for converting the process region H to binary values.

Figure 5:
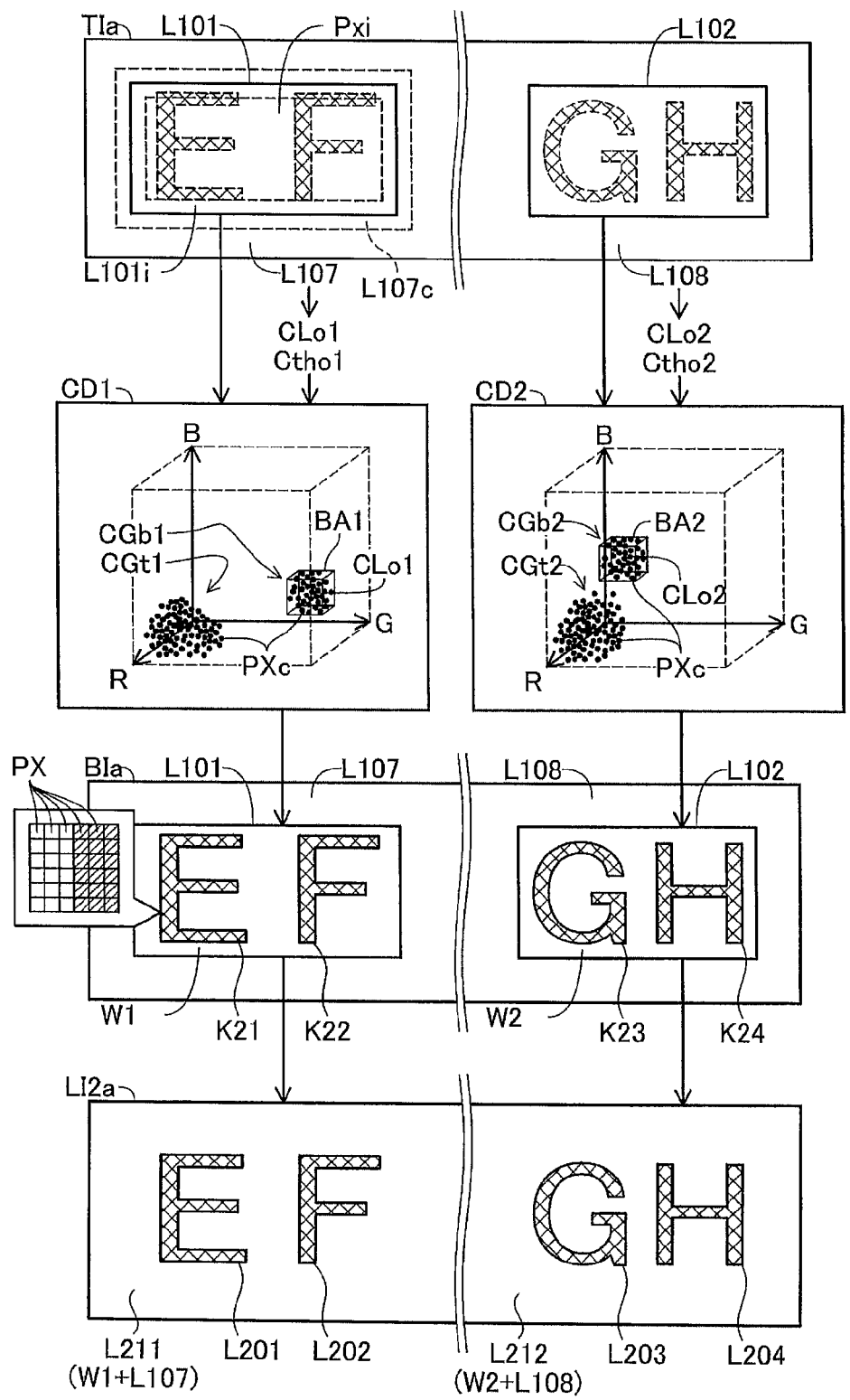
FIG. 5 is a schematic diagram showing one example of a process of processing two non-uniform regions.

FIG. 5 is a schematic diagram showing one example of a process of processing the two non-uniform regions L101 and L102. FIG. 5 shows a partial region TIa of the target image TI. The partial region TIa includes both the first region L101 and the second region L102. The portion of the image between the first and second regions L101 and L102 (the third region L103) has been omitted from FIG. 5.

Here, the process performed when the first region L101 has been set as the process region H will be described. The second separation unit 130 identifies the uniform region surrounding the first region L101 (the seventh region L107 in this example). The second separation unit 130 can identify the uniform region surrounding the first region L101 by analyzing the first label image LI1 shown in FIG. 3, stage (B). The second separation unit 130 calculates a color CLo1 representing the seventh region L107 identified above (hereinafter called a first representative color CLo1). RGB gradation values Rr, Gr, and Br for the first representative color CLo1 are the average RGB gradation values for all pixels in the seventh region L107.

Since an object is normally arranged on a background, the seventh region L107 surrounding the first region L101 represents the background of the object in the first region L101. Hence, the first representative color CLo1 of the seventh region L107 is the same color as the background in the first region L101.

Next, the second separation unit 130 uses this first representative color CLo1 to determine a first set of threshold values Ctho1. In the embodiment, the first set of threshold values Ctho1 includes an upper limit and lower limit for each of the RGB color components. Specifically, the first set of threshold values Ctho1 includes the six threshold values R1, R2, G1, G2, B1, and B2 determined as follows.

Lower limit R1 of red=Gr−dV
Upper limit R2 of red=Gr+dV
Lower limit G1 of green=Gr−dV
Upper limit G2 of green=Gr+dV
Lower limit B1 of blue=Br−dV
Upper limit B2 of blue=Br+dV Here, the value dV is a predetermined value, and the values R1, R2, G1, G2, B1, and B2 define ranges of colors near the first representative color CLo1, i.e., near the background color.

After determining threshold values in S125 of FIG. 2, in S130 the second separation unit 130 uses these threshold values to convert the process region H to binary values (to generate binary image data). That is, the second separation unit 130 binarizes the process region H by using the threshold values. Specifically, the second separation unit 130 classifies each pixel in the process region H as an object pixel or a non-object pixel one pixel at a time. The second separation unit 130 sets the gradation value for each pixel in the binary image data to either a value representing an object pixel ("1", for example) or a value representing a non-object pixel ("0", for example).

The second separation unit 130 classifies a pixel Pxi in the process region H (the first region L101 in this example) as a non-object pixel if the gradation values Ri, Gi, and Bi for all RGB components of the pixel Pxi fall within the color ranges defined by the set of threshold values R1, R2, G1, G2, B1, and B2. In other words, the second separation unit 130 classifies the pixel Pxi as a non-object pixel if the gradation values Ri, Gi, and Bi satisfy the following three conditions E1-E3.

$R1(=Rr-dV)<Ri<R2(=Rr+dV)$  <First condition E1>

$G1(=Gr-dV)<Gi<G2(=Gr+dV)$  <Second condition E2>

$B1(=Br-dV)<Bi<B2(=Br+dV)$  <Third condition E3>

Since the color of the pixel Pxi is near the first representative color CLo1 (background color) if the above conditions are satisfied, the pixel Pxi most likely represents the background in this case.

On the other hand, the second separation unit 130 classifies the pixel Pxi as an object pixel if at least one of the gradation values Ri, Gi, and Bi of the color components falls outside the corresponding range, that is, if at least one of the three conditions E1-E3 is not satisfied. Since the color of the pixel Pxi is not close to the first representative color CLo1 in this case, the pixel Pxi most likely represents an image different from the background (an object).

A first color distribution CD1 in FIG. 5 illustrates a sample color distribution of pixels in the first region L101 within the RGB color space. The first color distribution CD1 includes a color range BA1 determined by the first set of threshold values Ctho1, i.e., the range in which all conditions E1-E3 are satisfied. Hence, the color range BA1 denotes the range of colors near the background color and will be hereinafter called the first background color range BA1. A single color point PXc in the graph denotes the color of one pixel. A first cluster of color points CGt1 among the plurality of color points PXc in the graph illustrates the distribution of color for pixels representing text, while a second cluster of color points CGb1 illustrates the distribution of color for pixels representing the background surrounding the text. Since the first cluster of color points CGt1 falls outside the first background color range BA1, the pixels corresponding to these color points are classified as object pixels (pixels representing text). Since the second cluster of color points CGb1 falls within the first background color range BA1, the pixels corresponding to these color points are classified as non-object pixels (pixels representing background).

A partial binary image BIa in FIG. 5 is an example of a portion of the binary image data corresponding to the first and second regions L101 and L102. Shaded areas in this diagram represent regions configured of object pixels, while non-shaded areas (white areas) represent regions configured of non-object pixels. In this example, pixels representing the characters "E" and "F" in the first region L101 are classified as object pixels, while all other pixels (pixels representing the background) are classified as non-object pixels.

After performing the binarizing process on the process region H in S130 of FIG. 2 to generate binary image data, in S135 the second separation unit 130 uses this binary image data to identify (label) object regions and non-object regions. That is, the second separation unit 130 identifies, as a single object region, a region configured of one or more contiguous object pixels that have the same binary value "1" determined through the binarization process, and identifies, as a single non-object region, a region configured of one or more contiguous non-object pixels that have the same binary value "0" determined through the binarization process. So, each object region is composed of one or more object pixels that have the binary value "1" and that are arranged continuously with one another, and each non-object region is composed of one or more non-object pixels that have the binary value "0" and that are arranged continuously with one another.

An image LI2a in FIG. 5 shows the results of identifying regions in S135. In these results, two object regions L201 and L202 identified in the image LI2a correspond to regions K21 and K22 in the partial binary image BIa for two characters.

Non-object regions depicted in the partial binary image BIa (in particular, a region W1 of non-object pixels surrounding the character regions K21 and K22) have a high probability of representing the same background as the seventh region L107 surrounding the first region L101. Therefore, in the embodiment, the second separation unit 130 identifies the region including the non-object region W1 in the first region L101 and the seventh region L107 surrounding the first region L101 as a single region L211. The second separation unit 130 assigns labels to the identified regions. For example, the second separation unit 130 assigns a label (identifier) to each pixel in the target image TI indicating the region to which the pixel belongs. The image LI2a in FIG. 5 shows a portion of the second label image LI2 shown in FIG. 3, stage (C).

After labeling the object regions and non-object regions in S135 of FIG. 2, in S140 the second separation unit 130 determines whether the above process has been performed on all non-uniform regions. If there remain any unprocessed non-uniform regions (S140: NO), the second separation unit 130 returns to S120 and performs the same process in S120-S135, just described for the first region L101, on the next unprocessed non-uniform region. Once all non-uniform regions have been subjected to the process (S140: YES), the second separation unit 130 advances to S145.

As another example, the second region L102 is subjected to the following process by the second separation unit 130. As shown in FIG. 5 the second separation unit 130 calculates a representative color CLo2 for the uniform region surrounding the second region L102 (the eighth region L108 in this case;

hereinafter referred to as a second representative color CLo2) and uses this second representative color CLo2 to determine a second set of threshold values Ctho2. A second color distribution CD2 in FIG. 5 illustrates the color distribution for pixels in the second region L102. A second background color range BA2 in this graph is the range of colors defined by the second set of threshold values Ctho2. Since the color of the seventh object Ob7 (see FIG. 3, stage (A)) differs from the color of the sixth object Ob6 in this example, the second representative color CLo2 differs from the first representative color CLo1. Consequently, the second set of threshold values Ctho2 differs from the first set of threshold values Ctho1 and, hence, the second background color range BA2 differs from the first background color range BA1.

A first cluster of color points CGt2 in the graph illustrates the distribution of colors for pixels representing text, while a second cluster of color points CGb2 illustrates the distribution of colors for pixels representing the background surrounding the text. Since the first cluster of color points CGt2 falls outside the second background color range BA2, the pixels corresponding to these color points are classified as object pixels (pixels representing text). Since the second cluster of color points CGb2 falls within the second background color range BA2, pixels corresponding to these color points are classified as non-object pixels (pixels representing the background). Next, the second separation unit 130 identifies two object regions L203 and L204 corresponding to the two character regions K23 and K24 shown in the partial binary image BIa. The second separation unit 130 identifies the region including a non-object region W2 surrounding the character regions K23 and K24 and the eighth region L108 as a single region L212.

The second separation unit 130 performs a similar process for the fourth region L104 (see FIG. 3, stage (B)) to separate object regions from non-object regions. As shown in FIG. 3, stage (C), the second separation unit 130 identifies three regions L206, L207, and L208 representing the characters "W", "X", and "Y".

The second separation unit 130 similarly separates object regions from non-object regions in non-uniform regions representing (including) objects of a type other than text. For example, the second separation unit 130 incorporates non-object regions in the fifth region L105 shown in FIG. 3, stage (B) (such as the region representing background surrounding the photo image Ob3 shown in FIG. 3, stage (A)) into the uniform region L100 surrounding the fifth region L105, and identifies the non-object regions in the fifth region L105 as part of a single region L200 (see FIG. 3, stage (C)). The second separation unit 130 identifies the object region in the fifth region L105 as a ninth region L209 (see FIG. 3, stage (C)).

Similarly, the second separation unit 130 identifies the object region in the sixth region L106 shown in FIG. 3, stage (B) as a tenth region L210 (see FIG. 3, stage (C)), and identifies the object region in the third region L103 of FIG. 3, stage (B) as a fifth region L205 (see FIG. 3, stage (C)). For the uniform regions, the second separation unit 130 identifies each uniform region as a single region. For example, the second separation unit 130 identifies the uniform region L100 in FIG. 3, stage (B) as the $0^{th}$ region L200 (see FIG. 3, stage (C)).

As a result of the above process, the second separation unit 130 identifies thirteen regions L200-L212. Hence, the total number of identified regions is 13 and will be called a total label number K.

Among all the regions thus identified by the second separation unit 130, the generation unit 140 (see FIG. 1) consolidates in S145 (FIG. 2) those regions that satisfy conditions described later. In this process, the generation unit 140 consolidates characters that are separated from each other. FIG. 6 is a flowchart illustrating steps in the consolidation process. In S200 of the consolidation process shown in FIG. 6, the generation unit 140 selects the background region from among the regions identified by the second separation unit 130 (regions L200-L212 in the example of FIG. 3, stage (C)). The background region is the uniform region corresponding to edge parts in the target image TI shown in FIG. 3, stage (A). Using the example of FIG. 3, stage (C), the generation unit 140 selects the $0^{th}$ region L200 as the background region. The $0^{th}$ region L200 is excluded from the targets of consolidation.

After selecting the background region in S200, in S205 the generation unit 140 selects one unprocessed region as a process region N. In S210 the generation unit 140 determines whether the number of pixels in the process region N is no greater than a prescribed reference pixel number. This reference pixel number is preset. For example, the reference pixel number may be preset to such a value that is slightly higher than the maximum number of pixels that the process region N may have when the process region N represents a single character that should be consolidated with other regions. If the number of pixels in the process region N exceeds the reference pixel number (S210: NO), the generation unit 140 returns to S205, thereby excluding the current process region N for consideration. Since the current process region N is larger than a typical character in this case, it is highly probable that the process region N represents (includes) an object of different type than text.

Figure 7A:
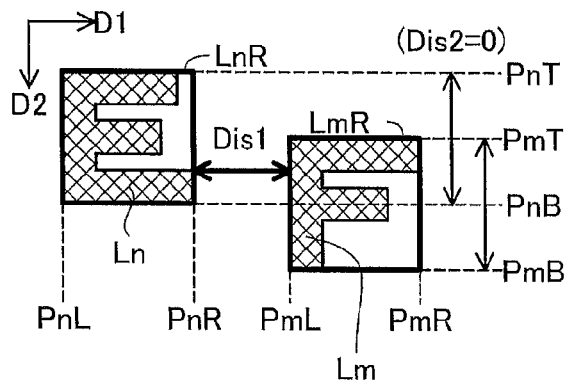
FIG. 7A and FIG. 7B are schematic diagrams illustrating consolidation of two regions, wherein FIG. 7A indicates a first distance along a first direction between the two regions, and FIG. 7B indicates a second distance along a second direction between the two regions.
Figure 7B:
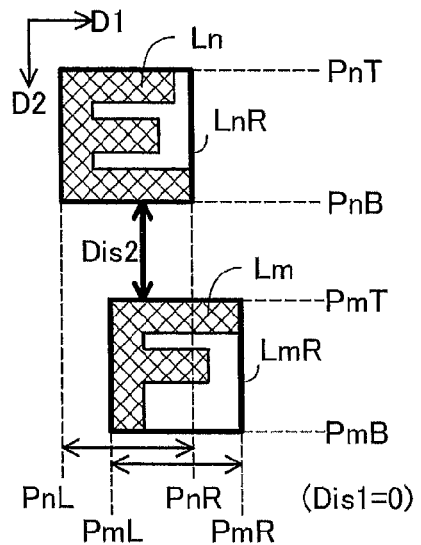

In the embodiment, the number of pixels in the process region N is considered the number of pixels included in the minimum bounding rectangle enclosing the process region N in the target image TI. FIG. 7A and FIG. 7B are schematic diagrams illustrating the consolidation of two regions. A process region Ln shown in FIG. 7A and FIG. 7B represents the character "E". The rectangle LnR is the minimum bounding rectangle for the process region Ln. The number of pixels in the rectangle LnR is considered the number of pixels in the process region Ln. In the embodiment, the minimum bounding rectangle of a region is configured of a rectangle having two parallel sides oriented in the first direction D1 and two parallel sides oriented in the second direction D2. The top side of the rectangle abuts the top edge of the region, the bottom side abuts the bottom edge, the left side abuts the left edge, and the right side abuts the right edge. Here, the top side and top edge will be considered the side and edge of the rectangle and region, respectively, positioned upstream relative to the second direction D2; the bottom side and bottom edge will be considered the side and edge downstream in the second direction D2; the left side and left edge will be considered the side and edge upstream relative to the first direction D1; and the right side and right edge will be considered the side and edge downstream in the first direction D1. Alternatively, the generation unit 140 may calculate the specific number of pixels in the process region N by counting only pixels in the process region N, that is, the generation unit 140 may count the number of pixels in the minimum bounding rectangle for the process region N, excluding those pixels not included in the process region N.

If the generation unit 140 determines in S210 of FIG. 6 that the number of pixels in the process region N is no greater than the prescribed reference pixel number (S210: YES), in S215 the generation unit 140 initializes a list of candidate regions M that are candidates for consolidation. As the list of candidate regions M, the generation unit 140 generates a list of those regions that have not been selected as the process region N in S205. For example, the first time the generation unit 140 executes the process in S215 for the example shown in FIG. 3, stage (C), the object region L201 has been selected as the process region N and the generation unit 140 generates a list of candidate regions M that include the remaining eleven regions L202-L212. The next time the generation unit 140 executes the process in S215 when the object region L202 has been selected as the process region N, the generation unit 140 generates a list of candidate regions M including the remaining ten regions L203-L212. Note that regions already consolidated with other regions are excluded from the list.

In S220 the generation unit 140 selects one unprocessed region from the list generated in S215 as the candidate region M. In the next three steps S225, S230, and S235, the generation unit 140 determines whether to consolidate the candidate region M with the process region N. To make this determination, the generation unit 140 determines whether the following three conditions are met in steps S225, S230, and S235, respectively.

<S225: First Condition F1>
The number of pixels in candidate region M is smaller than or equal to the reference pixel number. That is, the first condition F1 is represented by the following expression: number of pixels in candidate region M ≤ reference pixel number <S230: Second Condition F2>
A first distance Dis1 is smaller than or equal to a reference distance, and a second distance Dis2 is smaller than or equal to a reference distance. That is, the second condition F2 is represented by the following expression:

first distance Dis1 ≤ reference distance, and second distance Dis2 ≤ reference distance <S235: Third Condition F3>
A tonal difference TD is smaller than or equal to a reference tonal difference. That is, the third condition F3 is represented by the following expression:

tonal difference TD ≤ reference tonal difference

If the candidate region M satisfies all conditions F1, F2, and F3 (S225: YES, S230: YES, S235: YES), in S240 the generation unit 140 consolidates the candidate region M with the process region N.

The first condition F1 in S225 is similar to the condition in S210; that is, both conditions require the sizes of the process region N and candidate region M to be within the prescribed reference size. If the candidate region M does not meet the first condition F1 (S225: NO), it is probable that the candidate region M represents (includes) an object of different type than text. In this case, the generation unit 140 does not consolidate the candidate region M with the process region N, i.e., skips the process in S240.

The second condition F2 of S230 requires that the distance between the process region N and candidate region M be no more than a prescribed reference distance. The second condition F2 indicates that the candidate region M is near the process region N. FIG. 7A and FIG. 7B illustrate an example of the first and second distances Dis1 and Dis2 in the second condition F2. A candidate region Lm is shown in FIG. 7A and FIG. 7B together with the process region Ln. The target rectangle LnR is the minimum bounding rectangle for the process region Ln, while a candidate rectangle LmR is the minimum bounding rectangle for the candidate region Lm.

As shown in FIG. 7A, the first distance Dis1 is the shortest distance (in number of pixels) along the first direction D1 between the target rectangle LnR and the candidate rectangle LmR. As shown in FIG. 7B, the first distance Dis1 is "0" if the range of the target rectangle LnR in the first direction D1 (between a left edge PnL and a right edge PnR) at least partially overlaps the range of the candidate rectangle LmR in the first direction D1 (between a left edge PmL and a right edge PmR).

As shown in FIG. 7B, the second distance Dis2 is the shortest distance (in number of pixels) along the second direction D2 between the target rectangle LnR and the candidate rectangle LmR. As shown in FIG. 7A, the second distance Dis2 is "0" if the range of the target rectangle LnR in the second direction D2 (from a top edge PnT to a bottom edge PnB) at least partially overlaps the range of the candidate rectangle LmR in the second direction D2 (from a top edge PmT to a bottom edge PmB).

The reference distances for the second condition F2 are preset. For example, the reference distances may be preset to such values that are slightly larger than the maximum possible lengths of gaps along the first direction D1 and the second direction D2 that may exist between two characters that should be consolidated. If the candidate region M satisfies the second condition F2, it is highly probable that the candidate region M and process region N represent characters in the same character string. If the candidate region M does not satisfy the second condition F2 (S230: NO), it is likely that the candidate region M represents (includes) an object unrelated to the process region N. In this case, the generation unit 140 does not consolidate the candidate region M with the process region N (skips S240). Note that the distances between the process region N and candidate region M in the present invention may be set to any of various values representing distance and are not limited to the distances Dis1 and Dis2 described above. For example, the distance of the second condition F2 may be the shortest distance between the candidate region M and process region N not confined to any direction.

The third condition F3 in S235 requires that the difference in gradation values (tonal difference) between the process region N and candidate region M must be no greater than a prescribed reference tonal difference. Hence, the third condition F3 specifies that the color of the candidate region M must be near the color of the process region N. The following equation (2) is an equation for calculating the tonal difference TD for the third condition F3.

$$\text{Tonal Difference TD}=(Rav\_m-Rav\_n)^2+(Gav\_m-Gav\_n)^2+(Bav\_m-Bav\_n)^2 \qquad (2)$$

In the embodiment, the tonal difference TD is the square of the Euclidian distance between the average color of the process region N (Rav_n, Gav_n, Bav_n) and the average color of the candidate region M (Rav_m, Gav_m, Bav_m). The reference tonal difference for the third condition F3 is preset. For example, the reference tonal difference may be preset to such a value that is equal to the maximum possible tonal difference TD that a plurality of regions may possess therebetween when a plurality of characters in a character string that is represented in the same color are distributed among the plurality of regions. If the candidate region M does not satisfy the third condition F3 (S235: NO), it is highly likely that the candidate region M represents (includes) an object that is different from the process region N. In this case, the generation unit 140 does not consolidate the candidate region M with the process region N (skips S240). Note that the difference in gradation values between the process region N and candidate region M may be any of various types of values representing difference in gradation values and is not limited to the tonal difference TD described above. For example, the Euclidian distance in the YCbCr color space may be used as the difference in gradation values.

After the generation unit 140 consolidates the candidate region M with the process region N in S240 of FIG. 6 or after the generation unit 140 reaches a NO determination in one of the steps S225, S230, and S235, in S245 the generation unit 140 determines whether the above process has been completed for all candidate regions M in the list. If any unprocessed candidate regions M remain (S245: NO), the generation unit 140 returns to S220 and executes the process in S220-S240 on another unprocessed candidate region M. When all candidate regions M in the list have been processed (S245: YES), the generation unit 140 advances to S250.

In S250 the generation unit 140 determines whether the process region N has expanded since the last time S215 was executed, i.e., whether one or more candidate regions M has been consolidated with the process region N. If the process region N has expanded (S250: YES), the generation unit 140 repeats the process in S215-S245 described above using the expanded process region N. This enables the generation unit 140 to consolidate three or more regions.

FIG. 8A-FIG. 8D include schematic diagrams illustrating the process of consolidating the four regions L201-L204. The consolidation process in this example advances in the order FIG. 8A, FIG. 8B, FIG. 8C, and FIG. 8D. The schematic diagrams also show the minimum bounding rectangle for each region. The reference number for each bounding rectangle is configured by appending "R" to the reference number of the corresponding region. For example, rectangle L201R is the minimum bounding rectangle for the first region L201.

Figure 8A:
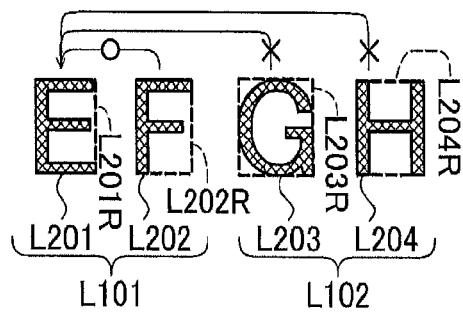

The first region L201 is the process region N in FIG. 8A (S205 of FIG. 6). Since the second region L202 neighboring the first region L201 meets conditions F1-F3, the generation unit 140 consolidates the second region L202 with the first region L201 (S240). However, since the third region L203 and fourth region L204 are separated farther from the first region L201 (since the second condition F2 is not satisfied), the generation unit 140 does not consolidate these regions with the first region L201. After the second region L202 is consolidated with the first region L201, in S250 of FIG. 6 the generation unit 140 determines that the process region N (the first region L201) has expanded. Therefore, in S215 the generation unit 140 generates a list for a first region L201b (see FIG. 8B) that has expanded to include the second region L202. This list includes the third region L203 and fourth region L204.

Figure 8B:
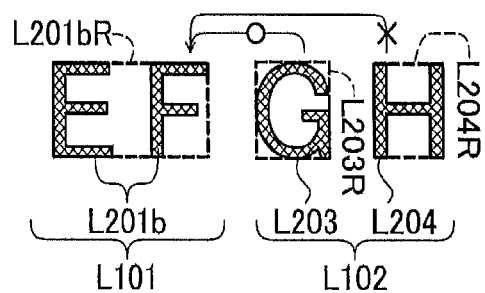

In FIG. 8B, the expanded first region L201b is now the process region N. Since the third region L203 neighboring the first region L201b satisfies the conditions F1-F3, the generation unit 140 consolidates the third region L203 with the first region L201b (S240 of FIG. 6). At this time, the minimum bounding rectangle L201bR bounding the expanded first region L201b (including characters "E" and "F") is used for determining whether conditions F1-F3 are satisfied. Again, the fourth region L204 is not integrated with the first region L201b since the fourth region L204 is positioned too far from the first region L201b.

When the third region L203 has been integrated with the expanded first region L201b as described above, in S250 of FIG. 6 the generation unit 140 determines that the process region N (the first region L201b) has expanded. Subsequently, in S215 the generation unit 140 generates a list for a first region L201c that has expanded to include the third region L203 (see FIG. 8C). This new list includes the fourth region L204.

Figure 8C:
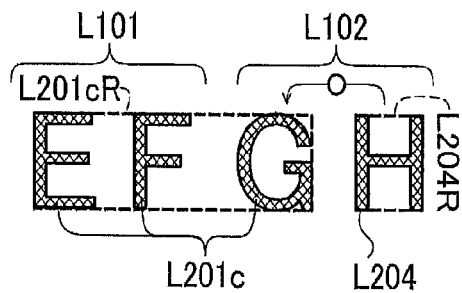
Figure 8D:
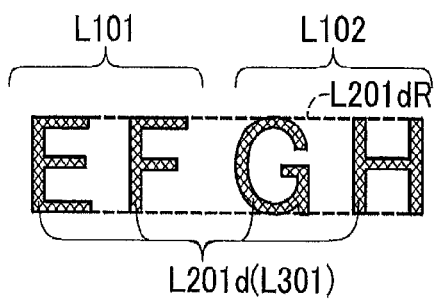

In FIG. 8C, the expanded first region L201c is now the process region N. Since the fourth region L204 neighboring the first region L201c satisfies the conditions F1-F3, the generation unit 140 consolidates the fourth region L204 with the first region L201c (S240 of FIG. 6), thereby producing an expanded first region L201d that includes the fourth region L204 (see FIG. 8D).

As described above, the generation unit 140 is able to consolidate three or more regions by determining whether the process region N has expanded and, if so, attempting to consolidate other regions with the expanded process region N.

Once the process region N has stopped expanding (S250: NO), in S255 the generation unit 140 determines whether the above process has been completed for all regions. If there remain any unprocessed regions (S255: NO), the generation unit 140 returns to S205 and selects an unprocessed region as the process region N. After all regions have been processed (S255: YES), in S260 the generation unit 140 updates the labels (region identifiers) and subsequently ends the consolidation process.

The third label image LI3 in FIG. 3, stage (D) shows the labeled regions as updated in the consolidation process of FIG. 6. As shown, the four regions L201, L202, L203, and L204 in FIG. 3, stage (C) (the four characters in the first text image Ob1 of FIG. 3, stage (A)) are consolidated into a single region L301. Similarly, the three regions L206, L207, and L208 in FIG. 3, stage (C) (the three characters in the second text image Ob2 of FIG. 3, stage (A)) are consolidated into a single region L303. The other six regions L200, L205, L209, L210, L211, and L212 in FIG. 3, stage (C) are not consolidated with other regions and remain unchanged as the six regions L300, L302, L304, L305, L306, and L307. Hereinafter, a region produced by consolidating a plurality of regions will be called a "consolidated region."

Figure 9:
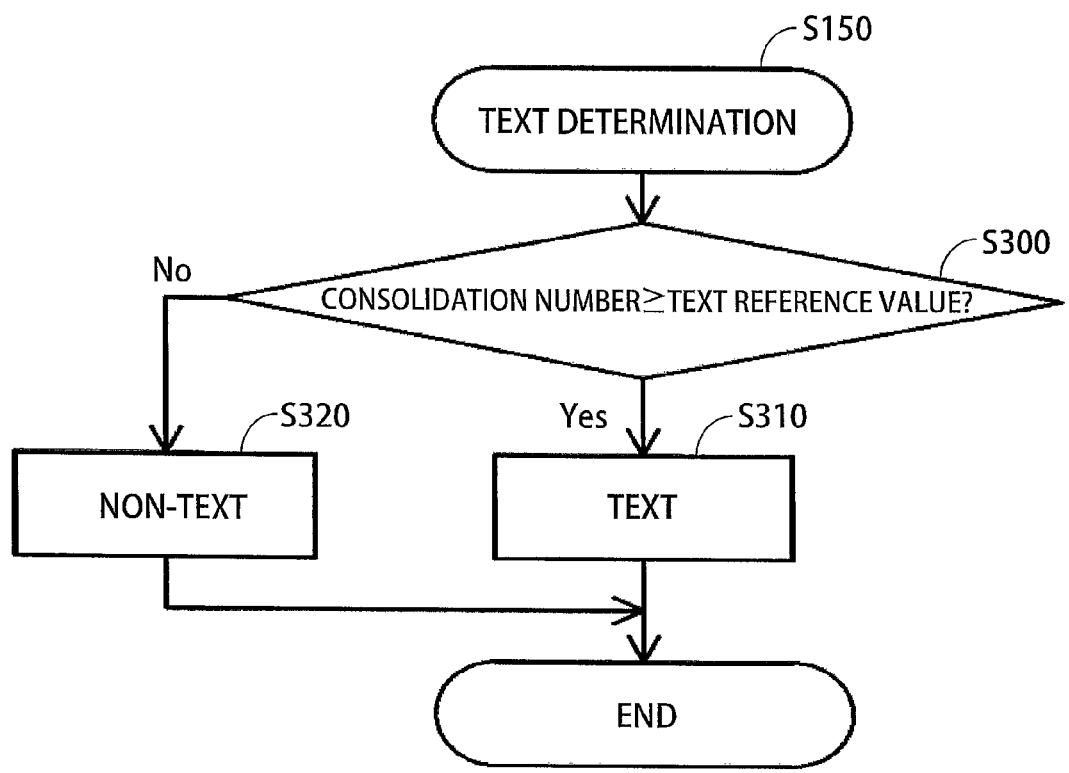
FIG. 9 is a flowchart illustrating steps in a text determination process shown in FIG. 2.

After completing the consolidation process in S145 of FIG. 2, in S150 the determination unit 150 determines whether the image type (the type of object in a region) is "text" for each of the regions produced by the generation unit 140 in the consolidation process. FIG. 9 is a flowchart illustrating steps in the text determination process. In S300 of the text determination process, the determination unit 150 determines whether the consolidation number of a region under inspection is at least a text reference value. The consolidation number is the total number of regions that have been consolidated to produce the region under inspection. For example, the consolidation number for the region L301 in FIG. 3, stage (D) is "4" and the consolidation number for the region L303 is "3". The text reference value is preset. For example, the text reference value may be preset to such a value that is slightly smaller than the minimum consolidation number that a consolidated region may possibly have when the consolidated region represents a typical character string. That is, the text reference value may be in a range of 2 to 3, for example. In S310 the determination unit 150 determines that the type of a consolidated region under inspection is "text" if the consolidation number is greater than or equal to the text reference value (S300: YES). In S320 the determination unit 150 determines that the type of the consolidated region is "non-text" if the consolidated number is less than the text reference value (S300: NO). The determination unit 150 also determines that any region not consolidated with other regions during the consolidation process of FIG. 6 is "non-text."

The image RI in FIG. 3, stage (E) shows the results of the text determination process. As shown, the regions L301 and L303 are determined to be of type "text," while the regions L300, L302, L304, L305, L306, and L307 are determined to be of the type "non-text."

After completing the text determination process in S150 of FIG. 2, in S155 the image adjustment unit 160 (see FIG. 1)

executes an image adjustment using the results of the text determination process. For example, the image adjustment unit 160 performs a process on "text" regions in the target image TI to enhance sharpness and performs preset color adjustment processes on "non-text" regions in the target image TI. Thus, the image adjustment unit 160 produces processed image data from the scan data by performing image adjustments using the results of determining image types. The image adjustment unit 160 stores the processed image data in the nonvolatile storage device 290. The stored image data is made available to the user for outputting an image, such as when printing or displaying the image.

In the embodiment, the average edge strengths ERave, EGave, and EBave calculated for each first block BL is an example of a characteristic value representing the degree of edge strength. Further, at least one of the expressions ERave≥ETr, EGave≥ETg, and EBave≥ETb being satisfied is an example of a characteristic value representing the degree of edge strength being greater than or equal to a prescribed reference value.

In the embodiment described above, the first separation unit 120 separates or divides the target image TI (FIG. 3, stage (A)) into a plurality of regions that include the first region L101 and second region L102 (FIG. 3, stage (B)). The second separation unit 130 separates or divides the first region L101 into the sub-regions L201 and L202 and separates the second region L102 into the sub-regions L203 and L204 (FIG. 3, stage (C)). Next, the generation unit 140 generates the consolidated region L301 (FIG. 3, stage (D)) by consolidating the sub-regions L201-L204. This process results in better precision for separating regions than when once separated regions are used as isolated regions without being consolidated with other isolated regions.

Further, as illustrated in FIG. 5, the second separation unit 130 separates the first region L101 using the first set of threshold values Ctho1 and separates the second region L102 using the second set of threshold values Ctho2, which is different from the first set of threshold values Ctho1. This process achieves better precision in separating regions than when the entire target image is separated into regions using a single threshold value.

The second separation unit 130 sets the first set of threshold values Ctho1 in this process based on gradation values in the region surrounding the first region L101 (the seventh region L107) and sets the second set of threshold values Ctho2 based on gradation values in the region surrounding the second region L102 (eighth region L108). Accordingly, the second separation unit 130 separates the first region L101 using the first set of threshold values Ctho1, specifically suited to the first region L101, and separates the second region L102 using the second set of threshold values Ctho2, specifically suited to the second region L102, thereby improving precision in separating regions.

As shown in FIG. 5, the second separation unit 130 identifies, as a single isolated region, such a region that is configured of one or more pixels that have the same binary value determined through the binarizing process and that are arranged contiguously. For example, a single object region is identified as a region configured of one or more contiguous object pixels having the binary value of "1", while a single non-object region is identified as a region configured of one or more contiguous non-object pixels having the binary value of "0". So, the second separation unit 130 can easily perform a process of separating regions. Hence, the process of separating regions is simplified.

As shown in FIG. 4B, the first separation unit 120 performs a process on the first blocks BL, each including a plurality of pixels PX, in order to isolate a plurality of regions including the first region L101 and second region L102 by units of blocks. This is a cruder separation than a process performed on each pixel PX for separating regions. The process can be simplified.

As shown in FIG. 5, the second separation unit 130 separates regions into sub-regions by each pixel PX. In this way, the second separation unit 130 can achieve a more refined separation of regions than a process of separating regions into sub-regions by units of blocks that include two or more pixels PX. Further, since the second separation unit 130 performs this more refined separation of regions after the first separation unit 120 has performed the cruder separation by units of first blocks BL, the precision in separating regions can be improved for cases in which the target image includes a plurality of types of regions (objects).

As shown in FIG. 4A-FIG. 4D, the first separation unit 120 extracts edge regions (non-uniform regions), each of which has a characteristic value representing the degree of edge strength (at least one of average edge strengths ERave, EGave, and EBave) that is greater than or equal to a prescribed reference, and separates the target image TI into: a plurality of regions including the two regions L101 and L102 that include edge regions; and the region L100 that does not include an edge region. Using edge strength to separate regions in this way improves precision in the separation of regions since the process is not dependent on colors in the target image.

A particular feature in the embodiment is that the first separation unit 120 first performs a crude separation of regions using edge strength, after which the second separation unit 130 performs a more refined separation of regions for each region isolated by the first separation unit 120 using the background color. Thus, the first separation unit 120 can separate the target image into a plurality of regions using edge strengths rather than threshold values for separating magnitudes of gradation (i.e., color). This method mitigates the effects that differences in colors of objects (particularly the background color) have on the separation process when the target image includes objects of various types. After the first separation unit 120 has performed its crude separation of regions, the second separation unit 130 performs a more refined separation of regions on each region isolated by the first separation unit 120 using threshold values for identifying the background color. There is a high probability that the background in a single region isolated by the first separation unit 120 will be uniform in color. Thus, the second separation unit 130 can suitably separate regions with a threshold value. Further, the second separation unit 130 can separate regions more precisely than the first separation unit 120. Accordingly, this process improves precision in separating regions.

As described with reference to FIG. 6 and FIG. 8A-FIG. 8D, the generation unit 140 produces a consolidated region by consolidating a plurality of isolated regions. Hence, when a region, such as the first object Ob1 that should be isolated as a single region, is instead separated into a plurality of sub-regions, the generation unit 140 can consolidate these sub-regions, thereby improving precision in separating regions. The three conditions F1-F3 must be met in order to consolidate two regions. These conditions ensure that separated regions can be appropriately consolidated.

As described with reference to FIG. 6 and FIG. 8A-FIG. 8D, the generation unit 140 first consolidates two regions to generate a consolidated region, then subsequently adds an additional region to the first consolidated region to update the region. Thus, the generation unit 140 can suitably generate a consolidated region that includes three or more regions.

As described with reference to FIG. 9, the determination unit 150 determines that the type of a consolidated region is "text" if a condition requiring the number of regions included in the consolidated region to be at least a text reference value is satisfied. Hence, the determination unit 150 can appropriately determine whether the type of a consolidated region is "text."

B. Variations of the Embodiment (1) The method of computing edge strength is not limited to the equation (1) described above, but may be any equation capable of computing a value representing the magnitude of change in gradation values. For example, the edge strength may be calculated by totaling the square of the magnitude of change in the first direction D1 and the square of the magnitude of change in the second direction D2. Further, other operators for edge detection may be used in place of the Sobel operator, such as the Prewitt operator or the Roberts cross operator. Further, edge strength need not be calculated based on the red, green, and blue color components, but may be calculated based on gradation values of other color components, such as brightness.

(2) The characteristic value expressing degree of edge strength, which is used by the first separation unit 120 to separate regions, may be any value that expresses degree of edge strength, such as the maximum value among the average edge strengths ERave, EGave, and EBave for the color components. The characteristic value may also be an edge strength calculated from brightness values.

The condition for determining whether the characteristic value representing the degree of edge strength is greater than or equal to a prescribed reference value is not limited to "at least one of the expressions ERave≥ETr, EGave≥ETg, EBave≥ETb" being satisfied, but may be any of various conditions. For example, when the characteristic value is expressed with a single value, the condition may be that the characteristic value is greater than or equal to a specific threshold value.

(3) The first blocks BL shown in FIG. 4B may have a different vertical dimension (number of pixels in the second direction D2) than horizontal dimension (number of pixels in the first direction D1). The first blocks BL may also be formed in shapes other than a rectangle. Further, the total number of pixels PX in one first block BL may be any value U, where U is an integer of 2 or greater.

The second separation unit 130 may also separate regions into sub-regions by units of second blocks, where a second block includes two or more pixels PX. This method can simplify the process performed by the second separation unit 130. In this case, the second separation unit 130 separates regions using a set of gradation values representing each second block (a set of gradation values for all the color components R, G, B). A set of gradation values representing a second block may be a set of average values for gradation values of all the pixels within the second block or a set of gradation values of a pixel at a prescribed position in the second block, for example.

Generally, it is preferable that the total number J of pixels PX in a second block be at least 1 and less than the total number U of pixels PX in a first block BL. Since the second separation unit 130 performs a refined separation of regions after the first separation unit 120 has performed a crude separation of regions, regions can be separated more precisely when the target image TI represents a plurality of types of regions (objects).

(4) The ranges "2×dV" of background colors set in S125 of FIG. 2 may be different for each color component. Additionally, the background color range may be a range in the RGB color space within which the distance (Euclidian distance) from the background color (Rr, Gr, Br) falls within a prescribed value. In general, the background color range may be any of various ranges that include the background color (Rr, Gr, Br).

Further, the background color (Rr, Gr, Br) (and more generally, the threshold values R1, R2, G1, G2, B1, B2) for the process region H may be calculated using gradation values from a portion of the peripheral region of the process region H (uniform region surrounding the process region H) that is near the process region H. For example, the first representative color CLo1 (background color) for the first region L101 in FIG. 5 may be calculated from a partial region L107c of the uniform region L107 that is a distance from the first region L101 no greater than a prescribed value.

Alternatively, the background color (Rr, Gr, Br) (and threshold values R1, R2, G1, G2, B1, B2) for the process region H may be calculated from gradation values in the edge portion of the process region H. For example, the first representative color CLo1 (background color) for the first region L101 in FIG. 5 may be calculated from the partial region L101i within the first region L101 whose shortest distance from the outline of the first region L101 is within a prescribed value.

Further, the background color (Rr, Gr, Br) (and threshold values R1, R2, G1, G2, B1, B2) for the process region H may be calculated using the gradation values in both of the peripheral region of the process region H and the edge portion of the process region H. For example, the first representative color CLo1 (background color) for the first region L101 in FIG. 5 may be calculated using the gradation values in both of: the first region L107 or the partial region L107c surrounding the first region L101; and the partial region L101i within the first region L101.

In the embodiment, for each color component R, G, and B, the average value of the gradation values in all the pixels within the peripheral region surrounding the process region H is used as the gradation value of the background color (Rr, Gr, Br) for the process region H. However, another value may be used as the gradation value of the background color (Rr, Gr, Br) for each color component R, G, and B. For example, for each color component R, G, and B, the mode (most frequently appearing value) or the median within the gradation values of all the pixels within the peripheral region surrounding the process region H may be used as the gradation value of the background color (Rr, Gr, Br) for the process region H. The same applies also for the case where the background color (Rr, Gr, Br) for the process region H is calculated using the gradation values in at least one of the peripheral region of the process region H and the edge portion of the process region H.

(5) The second separation unit 130 may separate regions using any of various methods not limited to the method of converting gradation values to binary values. For example, the second separation unit 130 may perform a process similar to the first separation unit 120 for separating regions using edge strength.

(6) In the process of FIG. 6, the generation unit 140 may be configured to select, as candidate regions M for the process region N, only those sub-regions that have been included in the same region with the process region N after the process of S105-S115, but that have been separated from the process region N through the process of S120-S135.

Further, the conditions for consolidating a candidate region M with the process region N may be one or two preselected conditions from among conditions F1, F2, and F3. One or more conditions other than conditions F1, F2, and F3 may also be employed for consolidating a candidate region M with the process region N.

Other methods for consolidating three or more regions may be employed in place of the method described in FIG. 8A-FIG. 8D in which regions are consolidated one at a time. For example, it is possible to employ a method of consolidation in which a plurality of pair regions (regions formed by consolidating two regions) satisfying the conditions of consolidation are generated first. Subsequently, among all the generated pair regions, only those pair regions that partially overlap with each other and therefore that include portions shared with each other are consolidated with each other.

(7) Other conditions for determining text may be required in addition to the condition that the consolidation number be greater than or equal to a text reference value. For example, a necessary condition for determining that a target region is text may be that the number of colors used in the target region be no greater than a prescribed value.

(8) In S155 of FIG. 2, various image processes may be performed using the results of the text determinations and are not limited to the processes described in the embodiment for sharpness enhancement and color adjustment. For example, the image adjustment unit 160 may perform a process to generate high-compression PDF (Portable Document Format) data by compressing text regions at a relatively high compression ratio and compressing other regions at a relatively low compression ratio.

Further, various image processes other than the text determination process in S150 of FIG. 2 may be implemented to use the results of separating regions. For example, the image adjustment unit 160 may execute a trimming process for automatically trimming images to present a user-selected object. With this configuration, the determination unit 150 may be omitted from the computer 200 in FIG. 1, and steps S150 (corresponding to the image RI in FIG. 3, stage (E)) and S155 of FIG. 2 may also be omitted.

Additionally, the image adjustment unit 160 may be omitted. In this case, the generation unit 140 may store image data representing the identified regions (image data representing the third label image LI3 in FIG. 3, stage (D), for example) in the nonvolatile storage device 290. This stored image data is available for use in various image processes.

(9) There may be cases in which the first separation unit 120 cannot separate the target region into a plurality of regions including a first region and a second region different from the first region (the "first separation"). For example, when the target image represents a single photo image, the first separation unit 120 in the embodiment will likely isolate the single region representing this photo image as the only region other than the background. Despite there being such cases in which the first separation unit 120 cannot execute the first separation, the first separation unit 120 is an example of a first separation unit configured to perform the first separation. This is because the first separation unit 120 can execute this first separation if the target image satisfies a first identification condition, that is, if the target image represents a plurality of separate objects, for example. In other words, the first separation unit 120 is an example of the first separation unit configured to perform the first separation.

There also may be cases in which the second separation unit 130 cannot separate the first region into a plurality of sub-regions and the second region into a plurality of sub-regions (the "second separation"). For example, if the target image represents a single photo image, the second separation unit 130 according to the embodiment may not be able to separate the single region representing the photo (a region separated by the first separation unit 120) into a plurality of sub-regions. Despite there being such cases in which the second separation unit 130 cannot execute the second separation, the second separation unit 130 is an example of a second separation unit configured to execute the second separation. This is because the second separation unit 130 can execute the second separation if the target image satisfies a second identification condition, that is, if the first region represents a character string configured of a plurality of characters and the second region represents a character string configured of a plurality of characters, for example. That is, the second separation unit 130 is an example of the second separation unit configured to perform the second separation.

There may also be cases in which the first threshold for the first region is identical to the second threshold for the second region. In other words, there may be cases in which the second separation unit 130 cannot separate the first region using the first threshold and the second region using a second threshold different from the first threshold ("dissimilar threshold separation"). For example, if the sixth object Ob6 has the same color as the seventh object Ob7 in the example of FIG. 3, stage (A), then the color of the seventh region L107 surrounding the first region L101 would be identical to the eighth region L108 surrounding the second region L102 in FIG. 3, stage (B). In this case, the first set of threshold values Ctho1 for the first region L101 may be the same as the second set of threshold values Ctho2 for the second region L102. Despite there being cases in which the second separation unit 130 cannot implement dissimilar threshold separation, the second separation unit 130 is an example of a second separation unit configured to perform dissimilar threshold separation. This is because the second separation unit 130 can perform this dissimilar threshold separation if the target image satisfies a third identification condition, that is, if the color of the region surrounding the second region is different from the color of the region surrounding the first region, for example. In other words, the second separation unit 130 is an example of the second separation unit configured to perform dissimilar threshold separation.

There may also be cases in which the generation unit 140 cannot produce a consolidated region by consolidating three or more sub-regions ("triple consolidated region generation"). For example, when the target image represents only a single character string configured of two characters, the generation unit 140 according to the embodiment may be unable to consolidate three or more sub-regions. Despite there being cases in which the generation unit 140 cannot implement triple consolidated image generation, the generation unit 140 is an example of a generation unit configured to perform triple consolidated image generation. This is because the generation unit 140 can perform such triple consolidated image generation if the target image satisfies a fourth identification condition, that is, if the target image represents a character string including three or more characters, for example. In other words, the generation unit 140 is an example of the generation unit configured to perform triple consolidated image generation.

There may also be cases in which the generation unit 140 cannot generate a consolidated image by consolidating at least two sub-regions among a plurality of sub-regions ("consolidated region generation"). For example, if the target image represents only a single photo image, it is possible that only a single region representing this photo image will be isolated as a region other than the background through the processes performed by the first separation unit 120 and second separation unit 130, in which case the generation unit 140 according to the embodiment cannot generate a consolidated region. Despite there being such cases in which the generation unit 140 cannot implement consolidated region generation, the generation unit 140 is an example of a generation unit configured to perform consolidated image generation. This is because the generation unit 140 can execute consolidated region generation if the target image satisfies a fifth identification condition, that is, if the target image represents a character string including two or more characters, for example. In other words, the generation unit 140 is an example of the generation unit configured to perform consolidated region generation.

(10) The image-processing functions performed by the scanner driver 100 in the computer 200 of the embodiment may be implemented by any image processor, such as the multifunction peripheral 400, scanner 300, or a digital camera (not shown), that includes an image-reading unit for optically reading an object to generate image data representing that object. In such cases, the image processor may perform image processes (such as the process described in FIG. 2) on image data generated with its own image-reading unit.

In general, the image processor implementing the image processes (such as the process in FIG. 2) described in the embodiment is not limited to the computer 200 and may be another type of device, such as a computer built into a printer, digital camera, scanner, or other image-related device; a general-purpose personal computer; or a server connected to a network. Alternatively, the functions required for implementing the image processes of the embodiment may be divided among a plurality of computers that can communicate with each other over a network so that, together, the computers can provide all necessary functions (the technology for this type of computer system is also referred to as "cloud computer"). In this case, the entire computer system corresponds to the image processor within the scope of the claims. In any case, the image data acquisition unit 110 that acquires the target image data may be provided in the image processor. The method of acquiring the target image data is arbitrary. For example, the image data acquisition unit 110 may acquire target image data from another component built into the image processor (such as the nonvolatile storage device 290 or an image-reading unit), or may acquire the target image data from another device (USB memory or a smartphone, for example) through a communication channel.

(11) Part of the configuration implemented in hardware in the embodiment described above may be replaced with software processes and, conversely, all or part of the configuration implemented in software may be replaced with a hardware configuration. As an example, the functions of all or some of the process units selected arbitrarily from the process units 110-160 in FIG. 1 may be implemented in hardware configured of logic circuits.

When all or part of the functions according to the present invention are implemented in software, the software (i.e., computer programs) can be stored on a computer-readable storage medium (for example, a storage medium not designed for temporary storage) and supplied to a user. Further, the software may be used on a storage medium (computer-readable storage medium) on which the software was originally stored when the software was supplied to a user (which will be referred to as "original storage medium" hereinafter), or may be used after being transferred from the original storage medium to a different storage medium (computer-readable storage medium). A "non-transitory computer-readable medium" may be a portable storage medium, such as a memory card or CD-ROM; an internal storage device built into the computer, such as any of various ROM or the like; or an external storage device, such as a hard disk drive, connected to the computer.

While the invention has been described in detail with reference to the embodiment thereof, it would be apparent to those skilled in the art that various changes and modifications may be made therein without departing from the spirit of the invention.

What is claimed is:

1. An image processing device comprising:
a processor; and
a memory storing computer-readable instructions therein, the computer-readable instructions, when executed by the processor, causing the image processing device to perform:
a first separation to separate a target image represented by target image data into a plurality of regions that include a first region and a second region different from the first region;
a second separation to separate the first region into a plurality of sub-regions and to separate the second region into a plurality of sub-regions;
generating a consolidated region by consolidating at least two sub-regions among the plurality of sub-regions separated from the first and second regions when the at least two sub-regions satisfy at least one of prescribed consolidation conditions, irrespective of whether the at least two sub-regions include a sub-region in the first region and a sub-region in the second region;
determining whether the consolidated region is a text region representing text,
wherein the first separation extracts, from the target image, edge regions, each of which has a characteristic value representing a degree of edge strength that is greater than or equal to a prescribed reference value, and separates the target image into the plurality of regions, the plurality of regions being classified into non-uniform regions and uniform regions, each non-uniform region including an edge region, each uniform region including no edge region, the first region and the second region being non-uniform regions, and wherein at least one uniform region is located between the first region and the second region thereby separating the first region and the second region from each other,
wherein the second separation includes:
determining a first representative gradation value for the first region based on at least one of a gradation value of a uniform region surrounding the first region and a gradation value of an outer edge portion within the first region, the first representative gradation value defining a first threshold value indicative of a first background gradation range, the first background gradation range including the first representative gradation value therein;
converting a gradation value of each pixel in the first region into a binary value by using the first threshold value and determining the plurality of sub-regions in the first region where each sub-region is configured of one or more pixels that are arranged contiguously and whose gradation values are out of the first background gradation range and are converted into the same binary value;
determining a second representative gradation value for the second region based on at least one of a gradation value of a uniform region surrounding the second region and a gradation value of an outer edge portion within the second region, the second representative gradation value defining a second threshold value indicative of a second background gradation range, the second background gradation range including the second representative gradation value therein; and converting a gradation value of each pixel in the second region into a binary value by using the second threshold value and determining the plurality of sub-regions in the second region where each sub-region is configured of one or more pixels that are arranged contiguously and whose gradation values are out of the second background gradation range and are converted into the same binary value, wherein the at least two sub-regions include a first sub-region and a second sub-region and wherein the prescribed consolidation conditions include following prescribed conditions 1)-3);

1) sizes of the first and second sub-regions are smaller than or equal to a prescribed reference size;
2) a distance between the first and second sub-regions is smaller than or equal to a prescribed reference distance; and
3) a difference in gradation values between the first and second sub-regions is smaller than or equal to a prescribed reference gradation difference, and wherein the image processing device determines that the consolidated region is a text region when a total number of sub-regions that are consolidated into the consolidated region is greater than or equal to a prescribed reference region number.

2. The image processing device according to claim 1, wherein the first separation separates the target image into the plurality of regions including the first and second regions by units of first blocks, each first block including a plurality of pixels, a total number of pixels in each first block being equal to a value U, where the value U is an integer of two (2) or greater.

3. The image processing device according to claim 2, wherein the second separation separates each of the first and second regions into the plurality of sub-regions by units of second blocks, each second block including one or more pixel, a total number of the pixel included in each second block being equal to a value J, where the value J is an integer that is greater than or equal to one (1) and is smaller than U.

4. The image processing device according to claim 3, wherein the value J is equal to one (1).

5. The image processing device according to claim 1, wherein the generating generates the consolidated region by consolidating three or more sub-regions.

6. The image processing device according to claim 5, wherein the generating consolidates two sub-regions to generate the consolidated region, and subsequently adds to the consolidated region a sub-region that is other than the already-consolidated two sub-regions, thereby updating the consolidated region.

7. An image processing method comprising:
performing a first separation to separate a target image represented by target image data into a plurality of regions that include a first region and a second region different from the first region;
performing a second separation to separate the first region into a plurality of sub-regions and to separate the second region into a plurality of sub-regions;
generating a consolidated region by consolidating at least two sub-regions among the plurality of sub-regions separated from the first and second regions when the at least two sub-regions satisfy at least one of prescribed consolidation conditions, irrespective of whether the at least two sub-regions include a sub-region in the first region and a sub-region in the second region; and
determining whether the consolidated region is a text region representing text, wherein the first separation extracts, from the target image, edge regions, each of which has a characteristic value representing a degree of edge strength that is greater than or equal to a prescribed reference value, and separates the target image into the plurality of regions, the plurality of regions being classified into non-uniform regions and uniform regions, each non-uniform region including an edge region, each uniform region including no edge region, the first region and the second region being non-uniform regions, and wherein at least one uniform region is located between the first region and the second region thereby separating the first region and the second region from each other, wherein the second separation includes:
determining a first representative gradation value for the first region based on at least one of a gradation value of a uniform region surrounding the first region and a gradation value of an outer edge portion within the first region, the first representative gradation value defining a first threshold value indicative of a first background gradation range, the first background gradation range including the first representative gradation value therein;

converting a gradation value of each pixel in the first region into a binary value by using the first threshold value and determining the plurality of sub-regions in the first region where each sub-region is configured of one or more pixels that are arranged contiguously and whose gradation values are out of the first background gradation range and are converted into the same binary value;

determining a second representative gradation value for the second region based on at least one of a gradation value of a uniform region surrounding the second region and a gradation value of an outer edge portion within the second region, the second representative gradation value defining a second threshold value indicative of a second background gradation range, the second background gradation range including the second representative gradation value therein; and converting a gradation value of each pixel in the second region into a binary value by using the second threshold value and determining the plurality of sub-regions in the second region where each sub-region is configured of one or more pixels that are arranged contiguously and whose gradation values are out of the second background gradation range and are converted into the same binary value, wherein the at least two sub-regions include a first sub-region and a second sub-region and wherein the prescribed consolidation conditions include following prescribed conditions 1)-3);

1) sizes of the first and second sub-regions are smaller than or equal to a prescribed reference size;
2) a distance between the first and second sub-regions is smaller than or equal to a prescribed reference distance; and
3) a difference in gradation values between the first and second sub-regions is smaller than or equal to a prescribed reference gradation difference, and wherein the consolidated region is determined to be a text region when a total number of sub-regions that are consolidated into the consolidated region is greater than or equal to a prescribed reference region number.

8. A non-transitory computer-readable medium storing computer-readable instructions therein, the computer-readable instructions, when executed by a processor, causing an image processing device to perform:
- a first separation to separate a target image represented by target image data into a plurality of regions that include a first region and a second region different from the first region;
- a second separation to separate the first region into a plurality of sub-regions and to separate the second region into a plurality of sub-regions;

generating a consolidated region by consolidating at least two sub-regions among the plurality of sub-regions separated from the first and second regions when the at least two sub-regions satisfy at least one of prescribed consolidation conditions, irrespective of whether the at least two sub-regions include a sub-region in the first region and a sub-region in the second region; and
- determining whether the consolidated region is a text region representing text,
- wherein the first separation extracts, from the target image, edge regions, each of which has a characteristic value representing a degree of edge strength that is greater than or equal to a prescribed reference value, and separates the target image into the plurality of regions, the plurality of regions being classified into non-uniform regions and uniform regions, each non-uniform region including an edge region, each uniform region including no edge region, the first region and the second region being non-uniform regions, and wherein at least one uniform region is located between the first region and the second region thereby separating the first region and the second region from each other,
- wherein the second separation includes:
- determining a first representative gradation value for the first region based on at least one of a gradation value of a uniform region surrounding the first region and a gradation value of an outer edge portion within the first region, the first representative gradation value defining a first threshold value indicative of a first background gradation range, the first background gradation range including the first representative gradation value therein;
- converting a gradation value of each pixel in the first region into a binary value by using the first threshold value and determining the plurality of sub-regions in the first region where each sub-region is configured of one or more pixels that are arranged contiguously and whose gradation values are out of the first background gradation range and are converted into the same binary value;
- determining a second representative gradation value for the second region based on at least one of a gradation value of a uniform region surrounding the second region and a gradation value of an outer edge portion within the second region, the second representative gradation value defining a second threshold value indicative of a second background gradation range, the second background gradation range including the second representative gradation value therein; and
- converting a gradation value of each pixel in the second region into a binary value by using the second threshold value and determining the plurality of sub-regions in the second region where each sub-region is configured of one or more pixels that are arranged contiguously and whose gradation values are out of the second background gradation range and are converted into the same binary value,
- wherein the at least two sub-regions include a first sub-region and a second sub-region and wherein the prescribed consolidation conditions include following prescribed conditions 1)-3);
1) sizes of the first and second sub-regions are smaller than or equal to a prescribed reference size;
2) a distance between the first and second sub-regions is smaller than or equal to a prescribed reference distance; and
3) a difference in gradation values between the first and second sub-regions is smaller than or equal to a prescribed reference gradation difference, and
- wherein the consolidated region is determined to be a text region when a total number of sub-regions that are consolidated into the consolidated region is greater than or equal to a prescribed reference region number.

* * * * *